United States Patent [19]
Linstead

[11] 3,714,937
[45] Feb. 6, 1973

[54] BARBECUE GRILL ASSEMBLY

[75] Inventor: Robert S. Linstead, Rockford, Ill.

[73] Assignee: King-Seeley Thermos Co., Ann Arbor, Mich.

[22] Filed: Jan. 11, 1971

[21] Appl. No.: 105,367

[52] U.S. Cl. .................................126/25 R, 16/179
[51] Int. Cl. ............................A47j 37/00, F24b 3/00
[58] Field of Search ...............126/25 R, 25 A; 16/179

[56] References Cited

UNITED STATES PATENTS

| 2,032,221 | 2/1936 | Myers | 16/179 UX |
| 3,611,915 | 12/1971 | Glaser et al. | 126/25 R X |

Primary Examiner—Charles J. Myhre
Attorney—Harness, Dickey & Pierce

[57] ABSTRACT

A barbecue grill assembly comprising a lower enclosure member provided with a generally horizontally disposed food supporting grill, an upper enclosure member adapted to be mounted on the first member, and means for movably connecting the upper and lower enclosure members whereby the upper enclosure member is movable between a first position substantially covering the grill and a second position providing access to the grill, the last mentioned means including means for pivotably supporting the upper enclosure member and for translating the upper enclosure member relative to the lower enclosure member as the former member is moved between the first and second positions.

4 Claims, 8 Drawing Figures

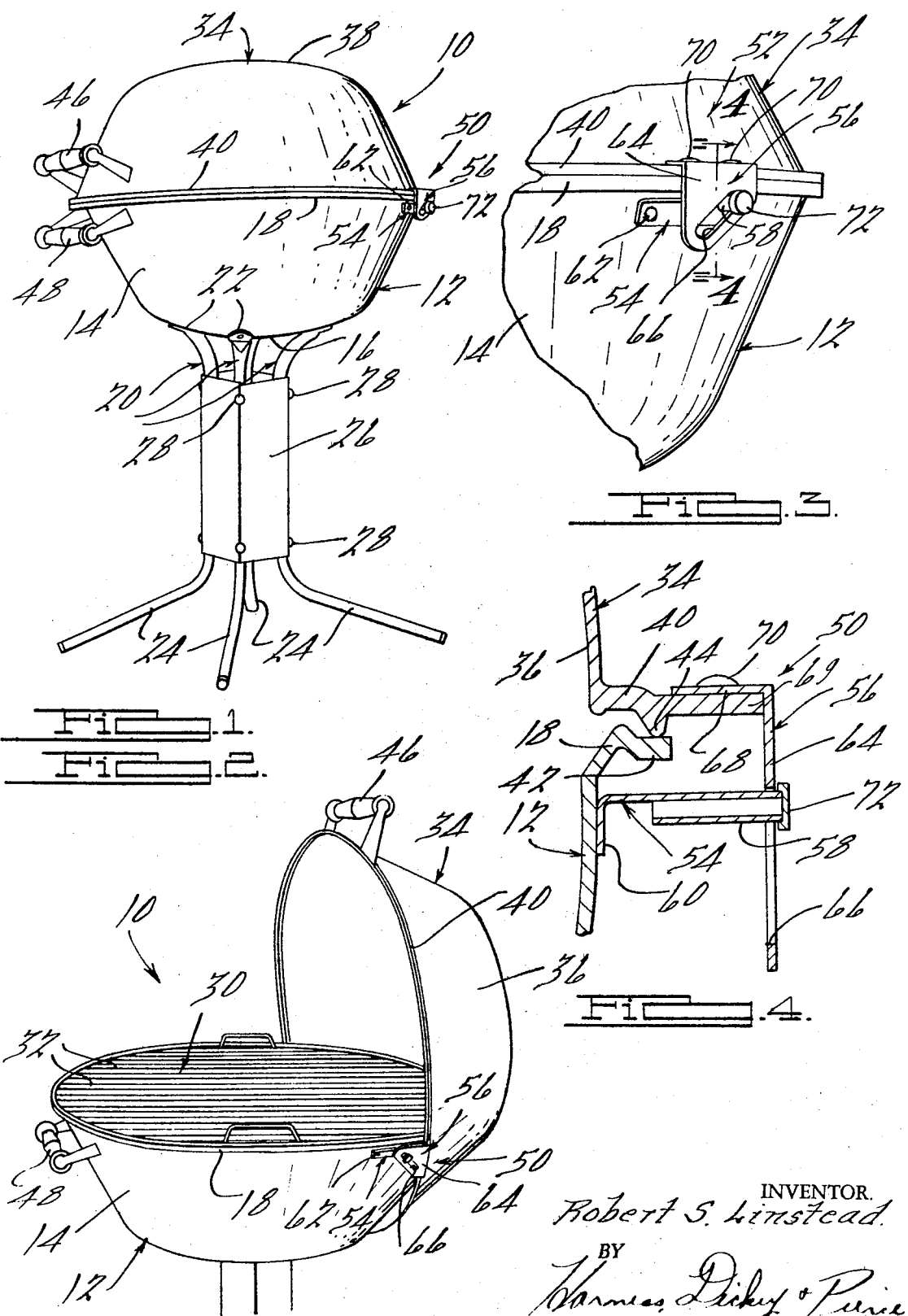

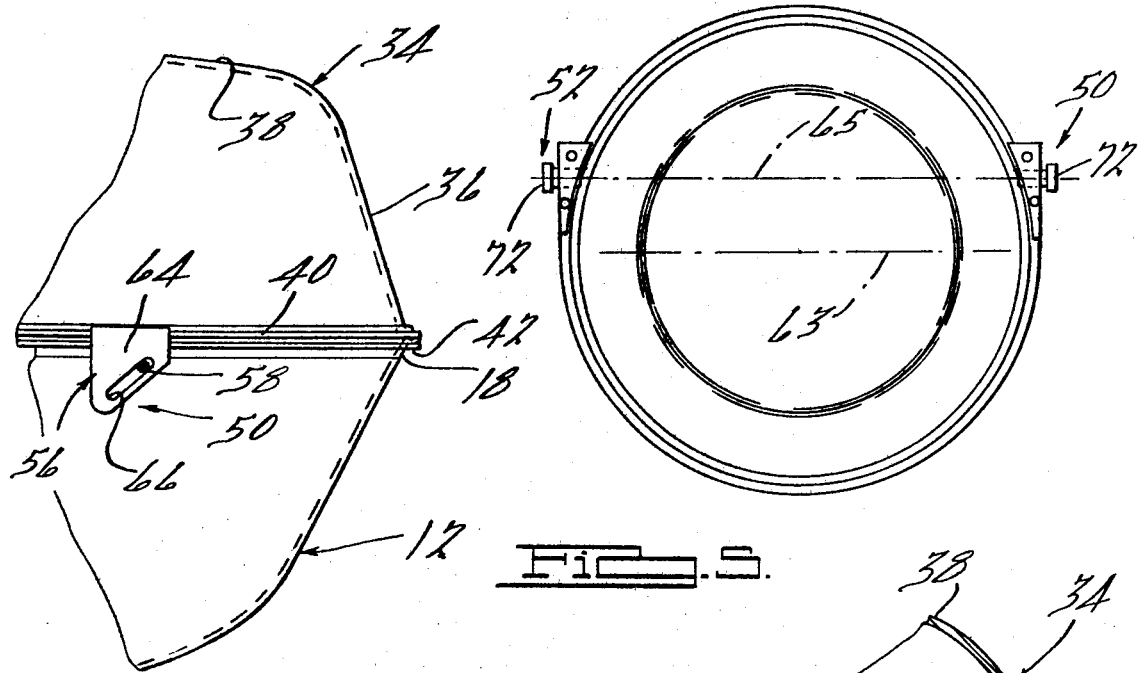
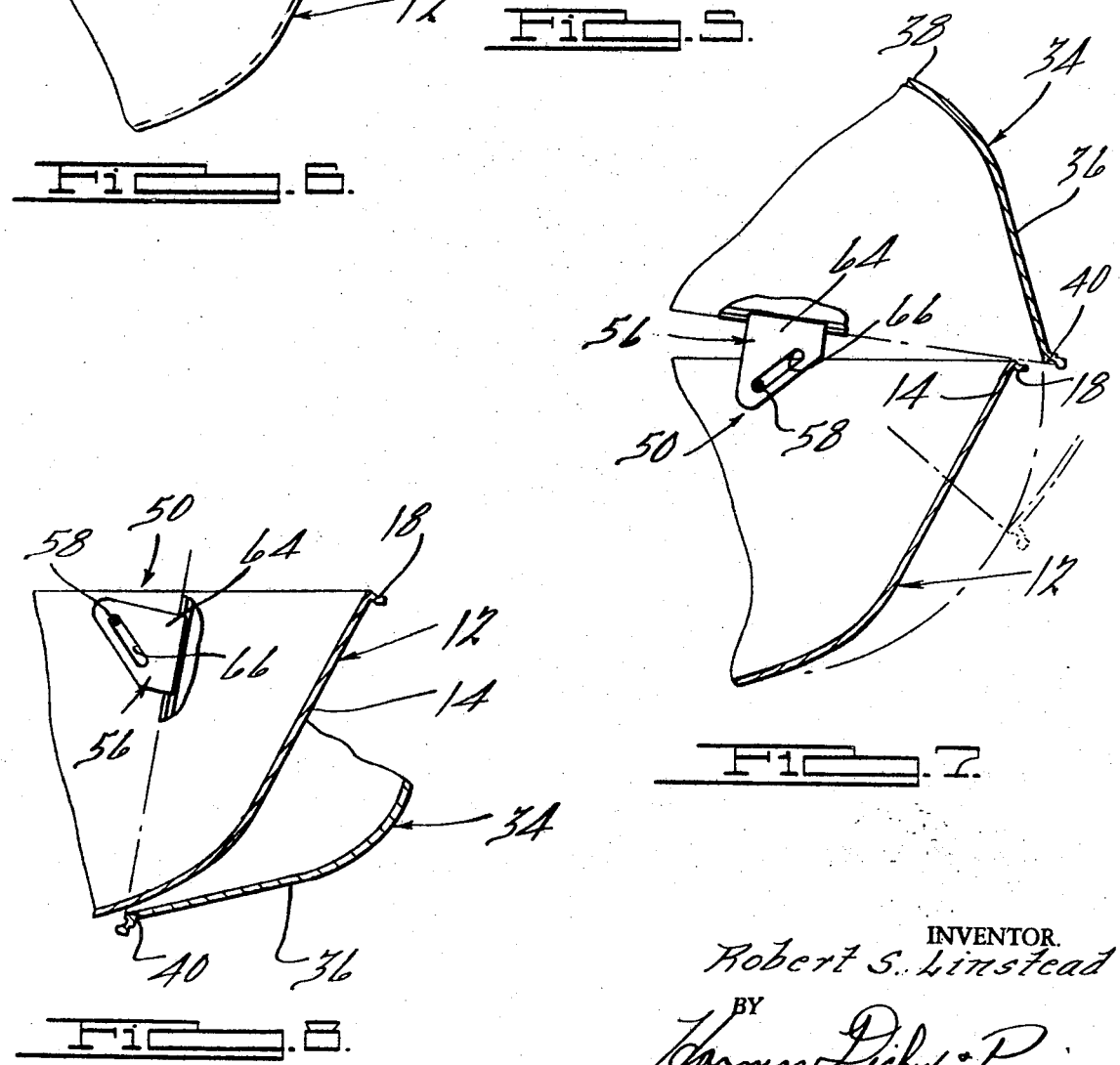

3,714,937

BARBECUE GRILL ASSEMBLY

BACKGROUND OF THE INVENTION

The practice of utilizing a pair of hingedly connected bowl-shaped enclosure members for barbecue type grill assemblies, wherein one of the enclosure members is adapted to house a bed of combusting fuel and a grate or grill upon which food may be heated or cooked, and the other of the enclosure member functions as a cover and is hingedly movable between positions enclosing and providing access to the food being cooked, has presented a number of problems in connection with the type of hinge means incorporated in hingedly mounting the relatively movable enclosure member with respect to the associated relatively non-movable enclosure member. The primary difficulty in providing a hinge connection between the aforesaid enclosure members originates from the fact that said members are of an annular or circular configuration and are usually of a size which requires a pair of laterally spaced hinge assemblies, as opposed to a single hinge assembly, in order to achieve the requisite stability during opening and closing movement of the cover member. Unfortunately, due to the geometry of connecting two circular members with a pair of laterally spaced hinge assemblies, it has been necessary to design such assemblies such that they project rearwardly or outwardly from the enclosure members a sufficient distance such that the hinge axis defined thereby is located outwardly, or at least tangent to, the periphery of the enclosure members. This has been necessary in order to permit interference-free pivotal movement of the upper enclosure member relative to the associated lower member and has been found to be highly objectionable from the standpoint that the hinge assemblies were necessarily quite large and projected a substantial distance outwardly from the enclosure members. A closely related problem in connection with the aforedescribed type of barbecue grill assembly incorporating circular upper and lower enclosure members resides in the difficulty of designing the hinge assemblies such that the upper enclosure members can be maintained in an open position so as to provide convenient access to the grill or grate within the associated lower enclosure members without the need for any ancillary "hold open" brackets or other devices or mechanisms.

The present invention is intended to overcome the aforementioned objectionable features of the above described type grill assemblies through the provision of a novel barbecue grill assembly which incorporates a unique hinge design which permits opening and closing movement of the upper enclosure member without requiring that the hinge assemblies project rearwardly or outwardly from the assembly an inordinately large distance, as has frequently been the case in prior art grills. Additionally, the hinge design of the present invention permits the upper enclosure member to be maintained in its respective open position solely under the influence of gravity, without the need for any ancillary hold open mechanisms and as will hereinafter be described in detail, the hinge design utilizes a pair of widely separated hinge assemblies which are constructed such that they may be of minimum size and afford highly desirable stability of movement of the upper enclosure member. The aforesaid features are achieved through the provision of a pair of hinge assemblies each comprising upper and lower hinge elements which are fixedly secured to the upper and lower enclosure members, respectively, and are pivotably connected to one another in a manner such that pivoting and translational movement occurs when the upper enclosure member is biased to and from an open position, with such movement assuring against any interference between the edge or rim portions of the enclosure members during the opening and closing of the grill.

It is accordingly a general object of the present invention to provide a new and improved barbecue grill assembly of the above described type.

It is a more particular object of the present invention to provide a new and improved barbecue grill assembly featuring a unique hinge arrangement whereby the upper enclosure member may be freely biased between respective open and closed positions without in any way interfering with the rim or edge of the lower enclosure member.

It is another object of the present invention to provide a hinge design as above described which comprises a pair of widely separated hinge assemblies which provide highly stable hinge movement of the upper enclosure member.

It is a related object of the present invention to provide a new and improved barbecue grill assembly of the above described type wherein the size of the hinge assemblies is minimized to the extreme so that said assemblies do not project away from the grill an objectionably large distance.

It is still another object of the present invention to provide a hinge design of the above character which permits pivotal and translational action between the upper and lower enclosure members so that the upper enclosure member slides rearwardly of the lower enclosure member upon opening movement thereof.

It is yet another object of the present invention to provide a new and improved barbecue grill assembly of the above described type wherein the center of gravity of the upper enclosure member is located rearwardly of the hinge axis so that the upper enclosure member will maintain itself in its respective open position when so placed.

It is still a further object of the present invention to provide a barbecue grill assembly of the above described type which is of a simple design, is easy to assemble and economical to manufacture.

Other objects and advantages of the present invention will become apparent from the following detailed description taken in conjunction with the accompanying drawings.

BRIEF DESCRIPTION OF THE DRAWINGS

FIG. 1 is an elevated perspective view of a barbecue grill assembly embodying the principles of the present invention;

FIG. 2 is an elevated perspective view similar to FIG. 1 and shows the upper enclosure member of the assembly illustrated therein in an open position or configuration;

FIG. 3 is an enlarged fragmentary side elevational view of one of the hinge assemblies incorporated in the barbecue grill assembly of the present invention;

FIG. 4 is an enlarged fragmentary cross-sectional view taken substantially along the line 4—4 of FIG. 3;

FIG. 5 is a top elevational view of the barbecue grill assembly illustrated in FIG. 1;

FIG. 6 is an enlarged fragmentary side elevational view of the upper and lower enclosure members of the barbecue grill assembly of the present invention, showing the upper enclosure member in its operative closed position;

FIG. 7 is an enlarged fragmentary side elevational view similar to FIG. 6 and illustrates the upper enclosure member in a partially open position; and FIG. 8 is an enlarged fragmentary side elevational view similar to FIGS. 6 and 7 and illustrates the upper enclosure member in a fully open position.

DETAILED DESCRIPTION OF THE PREFERRED EMBODIMENT

Referring now in detail to the drawings and in particular to FIG. 1, a barbecue grill assembly, generally designated by the numeral 10, in accordance with an exemplary embodiment of the present invention, is shown as comprising a generally bowl-shaped lower enclosure member 12 having an annular downwardly and inwardly extending side wall section 14 that terminates at the lower end thereof in a generally flat horizontally extending bottom section 16, and terminates at the upper end thereof in a generally circular-shaped rim or edge portion 18. The enclosure member 12 is adapted to be operatively supported by means of a plurality of support legs 20 which have upper end sections 22 fixedly secured to the member 12 by suitable screws, bolts or the like (not shown). The support legs 20 also comprise outwardly projecting lower end portions 24 which are adapted to rest or bear upon a suitable support surface, such as the floor of a patio, or upon the ground, etc. The support legs 20 are operatively secured to one another by means of a generally square cross-sectioned shroud 26 which extends around the intermediate portions of the support legs 20 and is secured thereto, as by suitable screws or the like 28. The enclosure member 12 is adapted to operatively support or house an annular food supporting grill 30 which comprises a plurality of spaced parallel support elements which are preferably fabricated of a suitable gauge wire or rod stock, the grill 30 being operatively disposed adjacent the upper end or rim portion 18 of the enclosure member 12, as best seen in FIG. 2.

The grill assembly 10, together with the lower enclosure member 12, comprises an upper enclosure member 34 which is similar in construction to the lower enclosure member 12 and comprises an annular tapered side wall section 36 that terminates at the upper end thereof in a generally horizontally disposed top section 38 and terminates at the lower end thereof in an annular rim portion 40. As best seen in FIG. 4, the rim portion 18 of the lower enclosure member 12 is formed with a generally horizontally disposed radially outwardly projecting flange portion 42, while the rim portion 40 of the upper enclosure member 34 is formed with a downwardly projecting shoulder 44 that is adapted to bear upon the flange portion 42 when the upper enclosure member 34 is disposed in the closed position shown in FIG. 1. The enclosure members 12, 34 may be fabricated of stamped or otherwise formed metal, or may be fabricated of a cast metal material, such as cast iron, cast aluminum or the like. As will hereinafter be described in detail, the upper member 34 is adapted to be pivotably biased between the closed position shown in FIG. 1 and the open position shown in FIG. 2, whereby to provide access to the grill 30. Toward this end, the upper and lower enclosure members 34 and 12 are provided with suitable handle means 46 and 48, respectively, in order to provide for convenient opening and closing of the upper enclosure member 34 and stabilization of the entire grill assembly 10 during such procedures.

In accordance with the principles of the present invention, the grill assembly 10 is provided with a pair of hinge assemblies 50 and 52 which generally function to hingedly connect the upper enclosure member 34 to the lower enclosure member 12 and permit convenient opening and closing movement of the upper enclosure member 34, as above described. The hinge assemblies 50, 52 are generally identical in construction and operation, with the exception that they are properly designed to be mounted on opposite sides of the assembly 10 and as such, each differs from the other only insofar as is necessary to permit such operative mounting thereof. Generally speaking, the assemblies 50, 52 comprises lower hinge elements 54 which are fixedly secured to the lower enclosure member 12, and upper hinge elements 56 which are operatively connected to the upper enclosure member 34 and cooperate with the associated of the lower elements 54 to hingedly connect the members 34, 12.

Referring now in detail to the lower hinge elements 54 as best seen in FIG. 4, said elements 54 comprise generally cylindrically shaped laterally outwardly projecting sections 58 that are integrally connected at their respective laterally inner ends to generally flat downwardly projecting mounting portions 60. The mounting portions 60 of the elements 54 are adapted to be fixedly secured to the laterally opposite sides of the side wall section 14 at positions directly below the radially outwardly projecting flange portion 42. As best seen in FIGS. 3 and 5, the lower hinge elements 54 are adapted to be fixedly secured to the outer side of the side wall section 14 by means of suitable screws, bolts or the like 62 extending through the mounting portions 60 thereof and the side wall section 14, the elements 54 being oriented slightly rearwardly of the diametrically extending line 63 shown in FIG. 5, such that the outwardly projecting sections 58 thereof are coaxially aligned and define a common hinge axis 65 about which the upper enclosure member 34 is pivotable in a manner hereinafter to be described.

As also illustrated in FIG. 4, the upper hinge elements 56 are of a generally L-shaped configuration and comprises generally flat or planar side sections 64 that depend downwardly from a position adjacent the shoulder 44 to a position in confronting relation with the lower hinge elements 54. The side sections 64 of the upper hinge elements 56 are formed with forwardly and downwardly inclined, generally oval-shaped elongated slots 66 through which the laterally outer ends of the cylindrical portions of the lower hinge elements 54 project, as will hereinafter be described. The upper hinge elements 56 also comprise generally flat, horizontally disposed mounting sections 68 which are formed integrally of the side sections 64 and project laterally inwardly therefrom at generally right angles thereto. The mounting sections 68 are adapted to be fixedly secured to a pair of generally outwardly extending ear sections, generally designated 69, that are formed integrally of the rim portion 40 of the upper enclosure member 34 and extend laterally outwardly therefrom, as best seen in FIG. 4. Suitable means in the form of screws, bolts or the like, generally designated by the numeral 70, may be utilized in operatively securing the mounting sections 68 of the upper hinge elements 56 to the upper (or lower) sides of the ear sections 69, as also seen in FIG. 4. In order to positively retain the side sections 64 of the upper hinge elements 56 at a position in registry with the cylindrical sections 58 of the lower hinge elements 54, a pair of generally cup-shaped retaining caps 72 fabricated, for example of plastic or the like, may be press-fitted onto the laterally outer ends of the cylindrical sections 58 and thereby prevent the side sections 64 from becoming inadvertently disengaged from the cylindrical sections 58, as best seen in FIG. 4.

In accordance with the present invention, the hinge elements 54, 56 of the assemblies 50, 52 are adapted to cooperate with one another so that as the upper enclosure member 34 is pivotally biased from the closed position shown in FIG. 1 to the open position shown in FIG. 2, the member 34, together with being thus pivoted, is actually translated or biased rearwardly from the position shown in FIG. 6 to the position shown in FIG. 7, whereby to prevent any interference between the rim portions 40 and 18 during such opening movement of the enclosure member 34. More particularly, the inclined orientation of the slots 66 through which the cylindrical sections 58 of the lower hinge elements 54 project, together with the particular geometry of locating the hinge assemblies 50 and 52 along the line 65 in FIG. 5, results in a camming action occurring between the inner periphery of the slots 66 and the cylindrical sections 58 of the lower hinge elements 54. Accordingly, as the upper enclosure member 34 is biased, for example, from the closed position shown in FIG. 6 toward the position shown in FIG. 7, the downwardly and forwardly inclined orientation of the slots 66 causes the enclosure member 34 to be translated rearwardly, as seen in FIG. 7. This, of course, results in the circumferential part of the rim portion 40 located interjacent the assemblies 50, 52 being simultaneously biased or cammed rearwardly so that there is no interference thereof with the rim portion 18 extending around the top of the lower enclosure member 12. Similarly, when the upper enclosure member 34 is biased from its respective open position shown, for example, in FIGS. 2 and 8, to the closed position shown in FIG. 6, the slots 66 in the upper hinge elements 56 and cylindrical sections 58 of the lower hinge elements 54 function to guide and translate the upper enclosure member 34 forwardly at the exact moment during the pivoting of the member 34 so that such pivoting thereof to the closed position may be accomplished without interference between the rim portions 40 and 18.

The above described construction and operation of the hinge assemblies 50, 52 provide a highly unique barbecue grill assembly having a number of features not shown in prior art grill assemblies and which provide a number of advantages thereover. For example, the above described assemblies 50, 52 permit wide separation therebetween, whereby to provide for stable pivoting movement of the enclosure member 34. Additionally, the size of the assemblies 50, 52 may be minimized to the extreme due to the fact that it is not necessary for said assemblies to project rearwardly of said enclosure members 12, 34 to a position wherein the hinge axis defined thereby is at least tangent to the rim portions thereof, as has been necessary in prior art devices. Thus, the size of the assemblies 50, 52 is kept small, and at the same time, the aesthetic appearance of the grill assembly 10 is substantially improved. A further feature of the above described construction resides in the fact that by so locating the hinge assemblies at a position located slightly rearwardly of the diametrically extending line 63, when the upper enclosure member 34 is biased to its respective open position providing access to the grill 30, the center of gravity of the member 34 is to be located rearwardly of the hinge axis lying along the line 65. Thus, the enclosure member 34 will be maintained in its open position solely under the influence of gravity and without the need for any ancillary hold-open devices, mechanisms, etc.

It will be appreciated that while the specific construction and design of the hinge assemblies 50, 52 described herein has been found to be preferable, various alternative constructions thereof will be found to be highly satisfactory and such alternatives, of course, are intended to come within the scope of the present invention. For example, it is conceivable that the hinge elements 54, 56 could be attached to the enclosure members 34, 12 in various alternative ways other than that shown herein and/or could be formed integrally therewith, as will be appreciated by those skilled in the art. Additionally, the present invention is not intended to be limited to a grill assembly having enclosure members 12 and 34 of the specific configuration shown herein, since the hinge assemblies 50, 52 will find highly satisfactory application in various alternate style enclosure members, for example, of semi-spherical shape or other designs wherein the rim portions thereof are of a relatively arcuate configuration.

While it will be apparent that the preferred embodiment illustrated herein is well calculated to fulfill the objects above stated, it will be appreciated that the present invention is susceptible to modification, variation and change without departing from the scope of the invention.

I claim:
1. In combination in a barbecue grill assembly,
   a generally bowl-shaped lower enclosure member provided with a food supporting grill and defining an annular rim portion,
   a generally bowl-shaped upper enclosure member adapted to be mounted on said first member and having a rim portion of substantially the same diameter as said first-mentioned rim portion and adapted to bear directly thereon, and
   means for movably connecting said upper and lower enclosure members whereby said upper enclosure member is movable between a first position substantially covering said grill and a second position providing access to said grill,
   said last mentioned means including a pair of outwardly projecting, laterally aligned cylindrical elements affixed to said lower enclosure member directly below said rim portion thereof, and a pair of slotted hinge elements fixedly secured to said upper enclosure member and extending downwardly therefrom and having said cylindrical elements continually slidably disposed within the slots thereof when said upper enclosure member is in either of said first or second positions, whereby to guide said upper enclosure member during movement between said positions and positively retaining said upper enclosure member on said lower enclosure member regardless of the relative position of said upper member.

2. The invention as set forth in claim 1 wherein said slots in said hinge elements are inclined upwardly and away from the center of said enclosure members when said rim portions thereof are disposed in confronting relation.

3. The invention as set forth in claim 1 wherein said cylindrical elements define a hinge axis extending parallel to a line extending diametrically through said enclosure members, and wherein the center of gravity of said upper enclosure member is disposed rearwardly of said hinge axis when said upper enclosure member is moved to said second position providing access to said grill.

4. The invention as set forth in claim 1 wherein said slots cammingly biasing said upper enclosure member rearwardly of said lower enclosure member as the former is moved from said first position toward said second position.

* * * * *